UNITED STATES PATENT OFFICE.

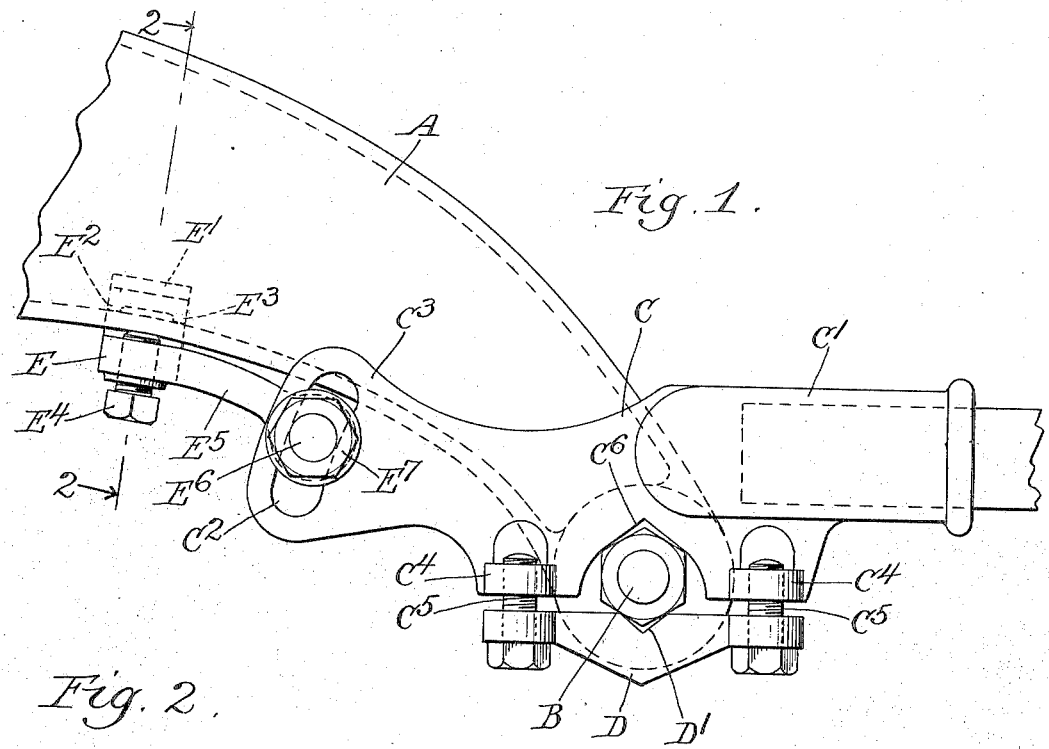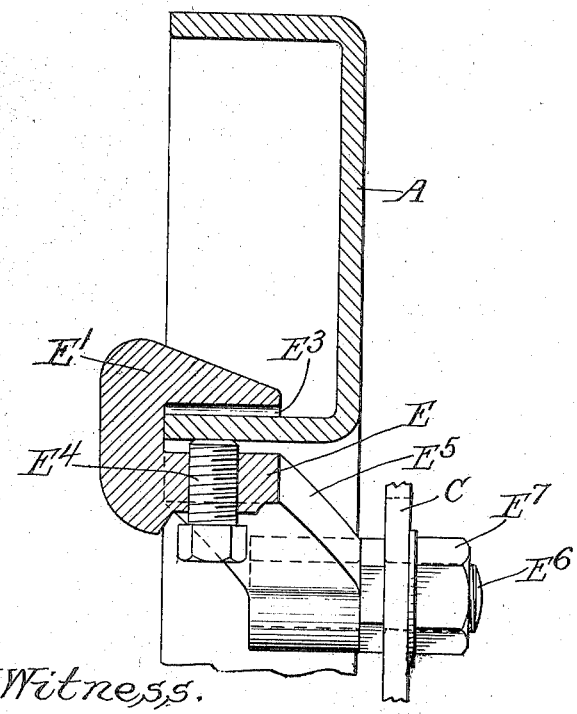

LEWIS P. HALLADAY, OF STREATOR, ILLINOIS.

BUMPER-BRACKET.

1,316,030.  Specification of Letters Patent.  Patented Sept. 16, 1919.

Application filed March 14, 1919. Serial No. 282,576.

*To all whom it may concern:*

Be it known that I, LEWIS P. HALLADAY, a citizen of the United States, residing at Streator, in the county of La Salle and State of Illinois, have invented a certain new and useful Improvement in Bumper-Brackets, of which the following is a specification.

My invention relates to improvements in automobile bumper brackets and has for one object to provide a bracket which may be rigidly and securely mounted on any standard automobile frame without any alteration or readjustment of the frame parts. Another object is to provide a buffer bracket of such character that it may be fitted upon any automobile frame irrespective of the shape or construction of the frame. Other objects will appear from time to time.

My invention is illustrated in the accompanying drawings, wherein—

Figure 1 is a side elevation with parts broken away.

Fig. 2 is a section along the line 2—2 of Fig. 1.

Like parts are indicated by like characters throughout.

A is a forward end of the automobile frame.

B is a spring bolt in the extreme front of it.

C is a bracket plate carrying in its forward end a socket $C^1$ which is adapted to receive and carry any form of automobile bumper. $C^3$ is a rearward extension of the bracket plate slotted as at $C^2$. $C^4$ are projections from the sides of the bracket plate adapted to receive the bolts $C^5$. $C^6$ is an angular notch in the underside of the bracket plate, adapted to ride upon and grip the nut on the spring bolt of the automobile frame.

D is a yoke with the angular notch $D^1$ in its upward surface, adapted to grip the nut on the spring bolt of the automobile frame.

E is a clamp provided with an upper extension $E^1$ adapted to overlap the automobile frame and having in its under surface the contact points $E^2$ $E^3$ which with the set screw $E^4$ give a three point contact of the clamp upon the automobile frame. $E^5$ is an arm extending from the clamp and carrying in its end the pin $E^6$ which is adapted to lie within the slot $C^2$ and to be secured therein by the nut $E^7$.

The use and operation of my invention are as follows:—

The bracket plate is positioned against the side of the automobile frame and upon the spring bolt, the notch overlying and gripping the bolt. The bracket is set at the desired angle and the bolts are then tightened so as to grip the spring bolt of the automobile frame between the bracket plate and the yoke and to hold the bracket in a fixed position.

As an additional means of support, for the bracket, I provide an auxiliary clamp which engages the bracket plate by means of the slot and pin before mentioned. When the bracket plate has been secured to the spring bolt the nut holding the pin in the slot is tightened and the clamp itself is tightened on the frame, thus providing an additional support for the main bracket.

I claim:

1. An automobile buffer bracket assembly including a buffer support adapted to be applied to a standard automobile frame and to engage and be supported upon the bolt head or nut of a spring bolt of said frame.

2. An automobile buffer bracket assembly including a buffer support adapted to be mounted upon a standard automobile frame to lie against said frame and to engage and be supported upon the bolt head or nut of a spring bolt of said frame.

3. An automobile buffer bracket assembly adapted to be mounted upon an automobile frame and including a buffer support adapted to be supported upon a spring bolt of the frame and notched in its under side for engagement with said bolt.

4. An automobile buffer bracket assembly adapted to be mounted upon an automobile frame and including a buffer support adapted to be supported upon a spring bolt of the frame and notched in its under side for engagement with said bolt, and means for securing it in engagement with said bolt.

5. An automobile buffer bracket assembly including a buffer socket, adapted to be applied to a standard automobile frame and to engage and be supported by the bolt head or nut of a spring bolt of said frame.

6. An automobile buffer bracket assembly including a buffer socket, adapted to be mounted upon a standard automobile frame to lie against said frame and to engage and be supported upon the bolt head or nut of a spring bolt of said frame.

7. An automobile buffer bracket assembly adapted to be mounted upon an automobile frame and including a buffer socket, and notched in its under side for engagement with said bolt.

8. An automobile buffer bracket assembly adapted to be mounted upon an automobile frame and including a buffer socket, and notched in its under side for engagement with said bolt, and means for securing it in engagement with said bolt.

9. An automobile buffer bracket assembly including a buffer support adapted to be mounted upon an automobile frame and engaging and supported upon the bolt head or nut of a spring bolt of said frame, and a buffer socket forwardly extended from said support.

10. An automobile buffer bracket assembly including a buffer support adapted to be mounted upon an automobile frame and engaging and supported upon the bolt head or nut of a spring bolt of said frame, a buffer socket forwardly extended from said support and a rearward extension from said buffer support.

11. An automobile buffer bracket assembly including a buffer support adapted to be mounted upon an automobile frame and engaging and supported upon the bolt head or nut of a spring bolt of said frame, a buffer socket forwardly extended from said support and a rearward extension from said buffer support, provided with a slot.

12. An automobile buffer bracket assembly adapted to be mounted upon an automobile frame and including a buffer support adapted to be supported upon a spring bolt of the frame and notched in its under side for engagement with the bolt nut, and means for securing it in engagement with said bolt, said means comprising a yoke notched in its upper surface for engagement with the bolt nut.

13. An automobile buffer bracket assembly adapted to be mounted upon a standard automobile frame and including in addition to a main bracket support mounted upon and carried by the bolt head or nut of a spring bolt in the automobile frame, an auxiliary clamp adapted to coöperate with it.

14. An automobile buffer bracket assembly adapted to be mounted upon a standard automobile frame and including in addition to a main bracket support mounted upon and carried by the bolt head or nut of a spring bolt in the automobile frame, an auxiliary clamp adapted to coöperate with it, and located at a distance from the spring bolt.

15. An automobile buffer bracket assembly adapted to be mounted upon a standard automobile frame and comprising in addition to a main bracket support mounted upon and carried by a spring bolt in the automobile frame, an auxiliary clamp, comprising means for gripping the automobile frame upon a point removed from the spring bolt and an arm extending from said clamp and adapted to be adjustably secured to the main bracket support.

16. An automobile buffer bracket assembly adapted to be mounted upon a standard automobile frame and comprising in addition to a main bracket support mounted upon and carried by a spring bolt in the automobile frame, an auxiliary clamp, comprising means for gripping the automobile frame upon a point removed from the spring bolt and an arm extending from said clamp and carrying a pin adapted to lie within a slot in said main bracket support and adjustable means for securing it therein.

17. An automobile bracket assembly, adapted to be mounted upon a standard automobile frame and including a main bracket support engaging and supported upon the bolt head or nut of a spring bolt of said frame and an auxiliary clamping member adapted to be secured to said automobile frame at a point distant from said spring bolt and adapted to be adjustably secured to said main bracket support.

18. An automobile bracket assembly adapted to be mounted upon a standard automobile frame, comprising a main bracket support engaging and supported upon the bolt head or nut of a spring bolt on said frame, an auxiliary support engaging said automobile frame at a point distant from said spring bolt and adjustable means for securing this assembly in fixed coöperative relation.

In testimony whereof, I affix my signature in the presence of two witnesses this 8th day of March, 1919.

LEWIS P. HALLADAY.

Witnesses:
GEO. G. HOOD,
I. GOEBEL.